No. 873,152. PATENTED DEC. 10, 1907.
J. H. MARTINDALE.
VALVE.
APPLICATION FILED JUNE 4, 1907.
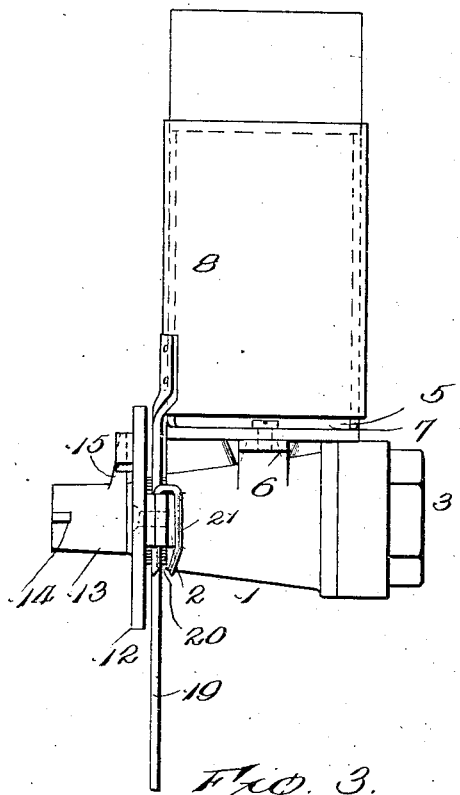
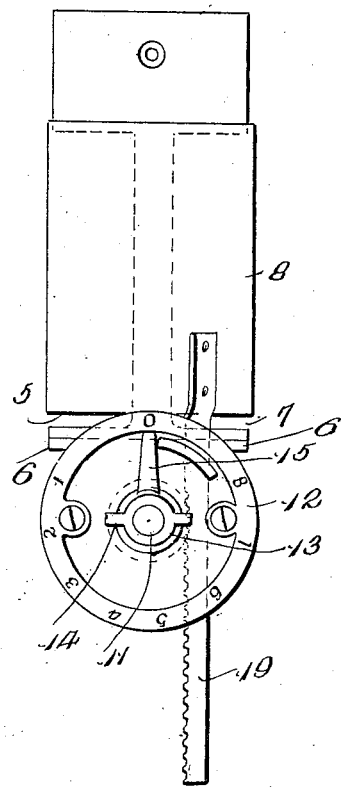
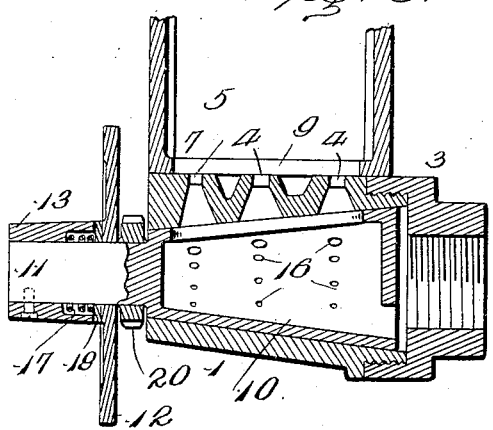
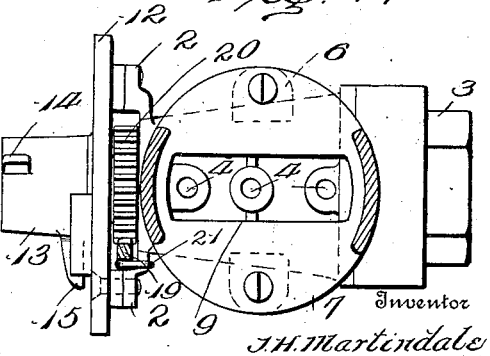
Inventor
J. H. Martindale

UNITED STATES PATENT OFFICE.

JOHN H. MARTINDALE, OF BRADFORD, PENNSYLVANIA, ASSIGNOR TO LEADER SPECIALTY MANUFACTURING COMPANY, OF SMETHPORT, PENNSYLVANIA, A CORPORATION OF PENNSYLVANIA.

VALVE.

No. 873,152.  Specification of Letters Patent.  Patented Dec. 10, 1907.

Application filed June 4, 1907. Serial No. 377,224.

*To all whom it may concern:*

Be it known that I, JOHN H. MARTINDALE, a citizen of the United States, residing at Bradford, in the county of McKean and State of Pennsylvania, have invented certain new and useful Improvements in Valves, of which the following is a specification.

The present invention relates to an improved valve mechanism for automatically regulating the simultaneous admission of air and gas to a mixing chamber in the proper proportions for producing the most perfect combustion, thereby enabling the greatest possible amount of heat to be obtained from a given quantity of the gas.

The device is particularly designed as a mixer for heaters and has for its object to provide a valve mechanism by means of which the flow of the gas can be readily regulated and which is so designed as to admit of a comparatively large range of adjustment.

For a full description of the invention and the merits thereof and also to acquire a knowledge of the details of construction and the means for effecting the result, reference is to be had to the following description and accompanying drawings, in which:

Figure 1 is a front elevation of a valve mechanism embodying the invention. Fig. 2 is a side elevation of the same. Fig. 3 is an enlarged vertical sectional view through the lower portion of the mechanism. Fig. 4 is an enlarged horizontal sectional view taken through the mixing chamber.

Corresponding and like parts are referred to in the following description and indicated in all the views of the drawings by the same reference characters.

The valve casing which is indicated at 1 tapers toward one end thereof, the smaller end being provided with the laterally extending arms 2 while the larger end is threaded upon its exterior to receive a coupling nut 3 designed to establish connection between the valve and a gas supply pipe. A plurality of outlet ports 4 are arranged longitudinally upon one side of the valve casing 1 and communicate with the mixing chamber 5 having the base thereof secured to brackets 6 projecting from the valve casing. The sides of the mixing chamber are formed with the air inlets 7 the effective size of which is controlled by a suitable valve such as the sleeve 8. It will also be observed that an elongated opening 9 is formed in the end of the mixing chamber adjacent the valve casing, the said opening being located directly over the outlet ports 4.

A tubular valve plug 10 is rotatably mounted within the valve casing 1 and tapered in a corresponding manner, the contracted end of the plug being closed and carrying a stem 11 which projects outwardly through an indicating plate 12 secured to the before mentioned laterally extending arms 2. A series of rows of openings 16 are formed in the tubular plug 10, the various openings of each row being designed to be brought successively into registry with the corresponding outlet port 4 as the valve is rotated, and varying successively in size to regulate the flow of the gas. The extremity of the stem 11 receives a cap 13 provided with suitable wings 14 for engaging a key and also with a pointer 15 designed to coöperate with suitable characters upon the indicating plate 12 to designate the size of the openings 16 of the valve plug which are in communication with the outlet ports 4. The cap 13 has the base thereof recessed to receive a spring 17 which bears against a washer 18 and operates to draw the tapered valve plug 10 within the valve casing 1 so that the two are held in a close contact with each other.

In order to provide for a simultaneous operation of the sleeve 8 controlling the admission of air to the mixing chamber 5 and the valve 10, the said sleeve 8 is provided with a rack bar 19 designed to engage a pinion 20 upon the stem 11. In the preferred embodiment of the invention the indicating plate 12 is slightly spaced from the end of the valve casing and the pinion 20 is located between the two members. With this construction it will be readily apparent that when the stem 11 is rotated through the medium of a suitable key engaging the cap 13, the valve plug 10 will be rotated to throw the desired openings 16 in communication with the outlet ports 4, and at the same time the sleeve 8 will be moved upon the mixing chamber 5 to correspondingly regulate the admission of air through the air inlet 7. The rack bar 19 is normally held in engagement with the pinion 20 by means of a U-shape key 21 fitting over one of the laterally extending arms 2 projecting from the smaller end of the valve casing. Upon removing this clip or key 21 from the said arm 2 the rack bar can be swung away from the pinion and moved longitudinally independently of the same in order to properly adjust the sleeve 8.

Having thus described the invention, what is claimed as new is:

1. In a device of the character described, the combination of a tubular valve casing tapering toward one end thereof and provided with a pair of laterally extending arms, an outlet port being formed in one side of the valve casing, a mixing chamber communicating with the outlet port and provided with an air inlet, a sleeve controlling the effective size of the air inlet, an indicating plate carried by the laterally extending arms of the valve casing, a hollow valve plug mounted within the valve casing and provided with a row of openings designed to be brought successively into registry with the outlet port, the said valve plug having a tapered formation and being provided with a stem which projects through the indicating plate, a head mounted upon the stem and coöperating with the indicating plate, and a spring mounted upon the stem and bearing against the indicating plate to hold the valve plug closely within the casing.

2. In a device of the character described, the combination of a tubular valve casing tapering toward one end thereof and provided with a pair of laterally extending arms, an outlet port being formed in the valve casing, an indicating plate secured to the laterally extending arms, a mixing chamber communicating with the outlet port and provided with an air inlet, a sleeve for controlling the effective size of the air inlet, a hollow valve plug mounted within the valve casing and provided with a row of openings designed to be brought successively into registry with the outlet port, the said valve plug having a tapered formation and being provided with a stem extending through the indicating plate, a head applied to the stem and coöperating with the indicating plate, a pinion rigid with the stem and located between the indicating plate and the valve casing, and a rack bar carried by the before mentioned sleeve and meshing with the pinion.

3. In a device of the character described, the combination of a valve casing, a valve within the casing, a mixing chamber communicating with the interior of the valve casing, a valve for controlling the admission of air to the mixing chamber, a rack bar for operating the second mentioned valve, a pinion operated by the first mentioned valve and engaging the rack, and a removable key normally holding the rack bar and pinion in engagement with each other.

4. In a device of the character described, the combination of a valve casing provided with a laterally extending arm, a valve mounted within the valve casing, a pinion operated by the said valve, a second valve controlling the admission of air to the mixing chamber, a rack bar for operating the second valve, the said rack bar being designed to engage the before mentioned pinion, and a U-shape key fitting removably over the laterally extending arm and normally holding the rack bar in engagement with the pinion.

In testimony whereof I affix my signature in presence of two witnesses.

JOHN H. MARTINDALE. [L. S.]

Witnesses:
 RALPH E. BURDICH,
 T. F. RICHMOND.